Jan. 20. 1925.
M. J. BRAY
1,523,510
STORAGE SYSTEM
Filed July 5, 1924
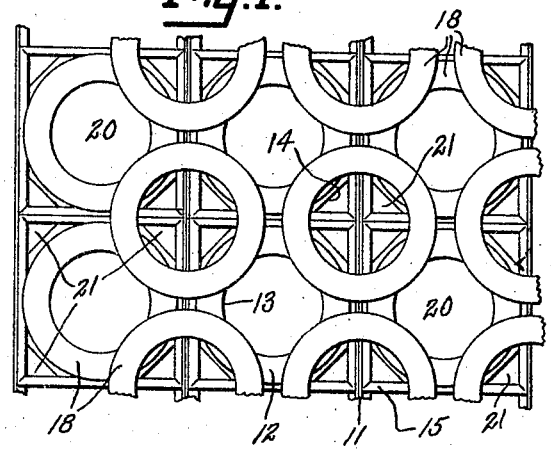
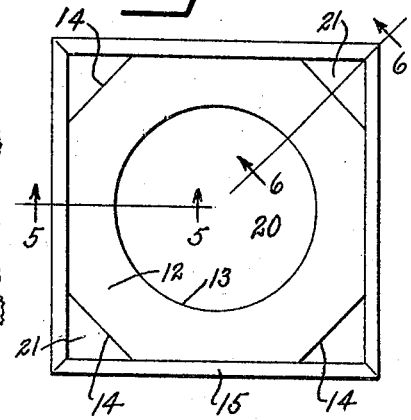
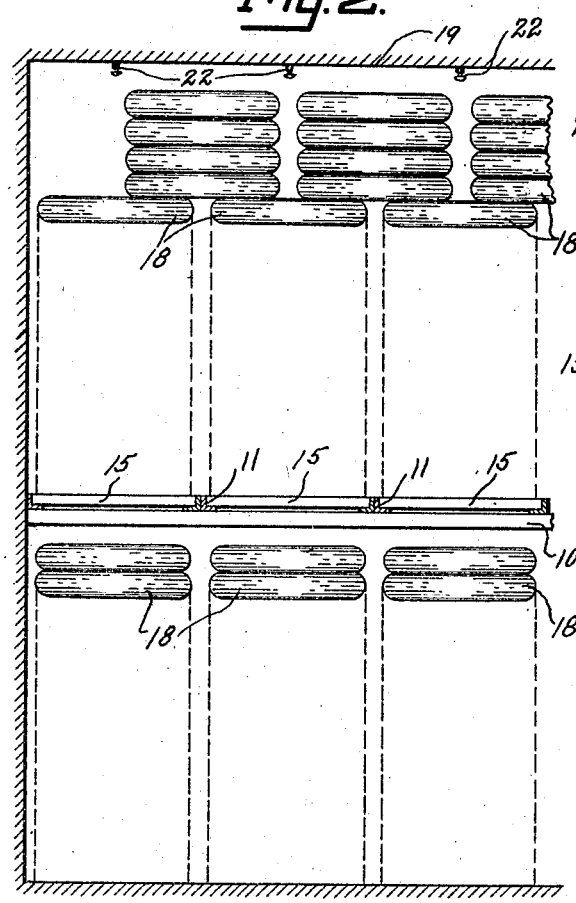
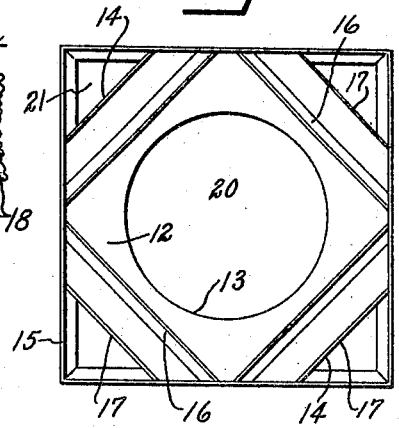
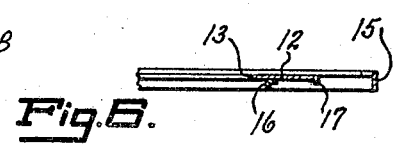
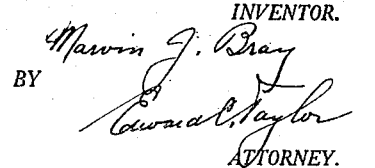
INVENTOR.
Marvin J. Bray
BY
Edward C. Taylor
ATTORNEY.

Patented Jan. 20, 1925.

1,523,510

UNITED STATES PATENT OFFICE.

MARVIN J. BRAY, OF SPRINGFIELD, MASSACHUSETTS, ASSIGNOR TO THE FISK RUBBER COMPANY, OF CHICOPEE FALLS, MASSACHUSETTS, A CORPORATION OF MASSACHUSETTS.

STORAGE SYSTEM.

Application filed July 5, 1924. Serial No. 724,273.

*To all whom it may concern:*

Be it known that I, MARVIN J. BRAY, a citizen of the United States of America, residing at Springfield, in the county of Hampden and State of Massachusetts, have invented certain new and useful Improvements in a Storage System, of which the following is a specification.

This invention relates to storage systems particularly designed for the storage of annular articles such as tire casings. Since the advent of the balloon tire, of large cross-sectional diameter and thin walls, the storage problem has become increasingly difficult of solution. With the older, so-called high pressure tires, the walls were sufficiently rigid so that high stacks could be made without crushing the lower tires. Balloon tires, on the contrary, are so flexible that destructive crushing occurs unless the piles are limited to about half their former height. This condition necessitates some structural device such as a mezzanine floor or gallery. The object of the present invention is to provide such a structure in which the tires can be stacked readily with a minimum of labor and transportation, with a minimum of interference with the floor space below, and without interference to any substantial extent with the overhead sprinkler system regularly installed in warehouses for fire protection.

Referring now to the drawings,

Fig. 1 is a plan of the structure with tires placed thereon;

Fig. 2 is a diagrammatic side elevation thereof;

Fig. 3 is a plan of a structural element;

Fig. 4 is a bottom view thereof; and

Figs. 5 and 6 are sections taken respectively on lines 5—5 and 6—6 of Fig. 3.

The mezzanine structure is supported on cross members 10 suitably attached to the wall or supported by columns from the floor, and on a series of pairs of angle irons 11 arranged back to back and resting on the cross members. The horizontal sides of the angle irons serve to support trays which are illustrated in detail in Figs. 3 to 6. These trays have a body portion or plate of sheet metal 12, of which the center is removed to form a circular aperture 13 and the corners removed at 14. Surrounding the plate 12 is a frame, conveniently composed of angle irons 15, which imparts rigidity and serves to support the plate on angle irons 11. Additional rigidity may be secured if desired by diagonally arranged angle irons 16 and by bending over the edges of plate 12 at 17. When a series of these trays are arranged upon the angle irons 11 they form an openwork flooring, removable in sections.

In use the mezzanine structure is preferably loaded with tires 18 before the floor below is loaded, since this gives an opportunity to utilize the advantages of the sectional flooring formed by the trays. One section may be removed and tires passed up through the hole thus formed, to be stacked by an attendant on neighboring trays. As successive stacks are completed the trays are replaced and other openings made in the floor in a similar manner. As shown, the piles of tires are not continued straight up to the ceiling 19, but are cross-braced by having the upper few tires piled in staggered relation to the lower piles. This manner of piling is not essential, but the mezzanine structure is particularly designed to permit of it, as will be described below. The tires below the mezzanine may be piled in any desired way, or this space utilized for other purposes. Where balloon tires are to be stored the structure described practically doubles the storing capacity of the warehouse.

As previously mentioned, one of the objects of this invention is adaption of the tire storing system to the requirements of sprinkler installations. No system which would prevent the water from overhead sprinkler systems reaching the floor would be permissible in a warehouse under modern insurance regulations. In the construction herein described the supporting devices for the tires present little more area in plan than the tires themselves. This is perhaps best shown in Fig. 1, where the round hole 20 in the center of the tires and plates 12, and the square hole 21 left by the cut-away corners 14, are clearly apparent. The latter holes also serve to permit passage of water through the entire stack of tires from sprinklers 22 (Fig. 2) even though additional staggered piles are employed as indicated in Figs. 1 and 2.

Having thus described my invention, I claim:

1. A tire storage structure comprising horizontal supports, and a series of trays with cut away corners and centers carried by said supports and forming together therewith a flooring adapted to receive piles of tires without substantially interfering with the passage of sprinkler water therethrough.

2. A tire storage structure comprising horizontal angle irons and a series of substantially square frames removably received between the flanges of the angle irons, each frame having a plate with cut away corners and center, and adapted to support a stack of tires while presenting no substantial increase in area over the tires themselves.

MARVIN J. BRAY.